(12) United States Patent
Halfon

(10) Patent No.: US 11,300,583 B2
(45) Date of Patent: Apr. 12, 2022

(54) ANEMOMETER

(71) Applicant: VENTUS-PRODUCT DEVELOPMENT & CONSULTING LTD, Nes Tziyona (IL)

(72) Inventor: Itzhak Halfon, Ness Tziyona (IL)

( * ) Notice: Subject to any disclaimer, the term of this patent is extended or adjusted under 35 U.S.C. 154(b) by 0 days.

(21) Appl. No.: 15/733,801

(22) PCT Filed: May 22, 2019

(86) PCT No.: PCT/IL2019/050575
§ 371 (c)(1),
(2) Date: Nov. 30, 2020

(87) PCT Pub. No.: WO2019/239398
PCT Pub. Date: Dec. 19, 2019

(65) Prior Publication Data
US 2021/0231700 A1    Jul. 29, 2021

(30) Foreign Application Priority Data

Jun. 14, 2018 (IL) .......................................... 260035

(51) Int. Cl.
*G01P 5/02* (2006.01)
*G01C 9/02* (2006.01)
*G01P 13/04* (2006.01)

(52) U.S. Cl.
CPC .................. *G01P 5/02* (2013.01); *G01C 9/02* (2013.01); *G01P 13/045* (2013.01)

(58) Field of Classification Search
CPC ............ G01P 5/02; G01P 13/045; G01C 9/02
(Continued)

(56) References Cited

U.S. PATENT DOCUMENTS 3,260,940 A * 7/1966 Deisinger ............... G01W 1/08
                                              73/170.28
5,173,690 A * 12/1992 Friedman .............. G01S 11/026
                                              340/870.1
(Continued)

FOREIGN PATENT DOCUMENTS

EP          1413899 A2    4/2004

OTHER PUBLICATIONS

International Preliminary Report on Patentability (IPRP—Chapter II PCT) issued for PCT/IL2019/050575 dated Jun. 2, 2020.

*Primary Examiner* — Nathaniel T Woodward
(74) *Attorney, Agent, or Firm* — Verrill Dana, LLP; Robert L. Hover

(57) ABSTRACT

Anemometer for independently measuring wind speed and direction in fluid medium. A second anemometer portion has at least one attribute resulting in different wind resistance in fluid medium than a first anemometer portion, such as a different: mass, shape, density, specific gravity, drag coefficient and/or freedom of motion. Different wind resistance causes inclination of anemometer when deployed to fall autonomously along a trajectory of fluid medium, where anemometer drag coefficient curtails initial ballistic trajectory such that anemometer enters free-fall descent after deployment. Anemometer includes inclinometer to obtain inclination measurements, and memory/transmitter to store/transmit inclination measurements. Local wind direction/speed is determined from inclination measurements based on direction/degree of anemometer inclination in correlation with measurement timings. Anemometer may be deployed from moving airborne platform. Anemometer may include conical second portion embedded into spherical first portion, where conical second portion has smaller mass and larger surface area than spherical first portion.

13 Claims, 5 Drawing Sheets

(58) Field of Classification Search
USPC .................................................... 73/861.85
See application file for complete search history.

(56) References Cited

U.S. PATENT DOCUMENTS

| | | | |
|---|---|---|---|
| 6,421,010 B1* | 7/2002 | Chadwick | G01S 3/48 |
| | | | 342/462 |
| 2014/0224009 A1* | 8/2014 | Brown | G01W 1/08 |
| | | | 73/170.28 |
| 2015/0027220 A1* | 1/2015 | Halfon | B64D 1/08 |
| | | | 73/170.11 |

* cited by examiner

ANEMOMETER

FIELD OF THE INVENTION

The present invention generally relates to anemometers and wind measurement devices.

BACKGROUND OF THE INVENTION

There are various types of measurement instruments and techniques known in the art for measuring wind speed and wind direction. A wind vane, also known as a "weather vane" or a "weathercock", is generally embodied by an asymmetrically shaped pointer mounted at its center of gravity onto a vertically oriented rod, such that one end of the pointer is oriented along the direction of the wind. The wind vane may also include a compass, such as a four-arm cross denoting the reference directions (North, West, East, South), providing reference axes for the pointer alignment. A related type of instrument is a propeller or windmill anemometer, which has a number of flat or helicoidal vanes rotating along an axis parallel to the direction of the wind. The wind speed can be calculated a function of the angular rotation of the vanes.

A windsock, also known as a "wind sleeve" or "wind cone", is a conical hollow tube made of fabric, which is mounted on a freewheeling pivot such that the tube points away from the direction of the wind blowing through it. Windsocks are typically brightly colored to enhance visibility, and are commonly employed at airports (to assist pilots), at chemical plants (due to risks of gas leakages), and along highways (for vehicle drivers).

A pitot tube is a pressure measurement instrument, consisting of a tube positioned parallel to the direction of a fluid stream and attached to a manometer (pressure gauge), providing a measurement of the fluid flow velocity. A tube anemometer is generally embodied by a U-shaped tube containing a liquid manometer where one end of the tube is bent horizontally facing the wind while the other end remains vertical parallel to the wind flow. The wind blowing into the horizontal tube end increases the pressure on one side of the manometer, while the wind flowing along the vertical tube end barely effects the pressure at the other side, such that the resulting liquid change in the tube provides an indication of the wind speed. Another type of anemometer that operates by measuring wind pressure is a plate anemometer, which is simply a vertically suspended flat plate, where the wind pressure against the plate surface is balanced by a spring. The spring compression determines the force applied by the wind against the plate. Plate anemometers provide poor response to light winds and variable wind conditions, and inaccuracies with strong winds.

A sonic anemometer utilizes ultrasound waves to measure wind speed, based on the propagation time of the ultrasound waves between a pair of transducers. Multiple ultrasonic transducers may be combined to produce a three-dimensional model of the wind flow. Sonic anemometers are well-suited for turbulence measurements due to their high temporal resolution, and are also relatively robust and durable due to a lack of moving parts. However, sonic anemometers are susceptible to inaccuracies during precipitation and rainy weather, and also may require compensation for the effects of the supporting structure.

A laser Doppler anemometer operates by measuring the reflected backscatter of a transmitted laser beam and the associated Doppler shift. The measured Doppler shift is used to calculate the speed of the particles in the air causing the backscattering, which corresponds to the wind speed in the surrounding area.

A ping-pong ball anemometer involves a simple configuration of a ping-pong ball (or similar lightweight object) suspended from a string. A measure of the angular displacement of the ping-pong ball provides an indication of the wind speed, while the displacement direction corresponds to the wind direction.

A smoke grenade may also be used to provide an indication of wind direction, which corresponds to the direction that the smoke emanates toward. While smoke grenades are simple to deploy, and may be used simultaneously for additional purposes, they are also potentially dangerous due to the contained chemicals and are typically restricted to authorized personnel. In addition, a smoke grenade cannot be deployed over water, and cannot be reused once the smoke has fully evaporated.

There are various situations and applications in which accurate wind speed and wind direction readings may be highly beneficial, particularly where such information is difficult or impossible to obtain by conventional anemometers. For example, firefighting efforts may be facilitated if accurate local wind parameters are measured at the location of the fire, where the wind parameters would otherwise be difficult to measure due to heavy smoke and/or topographical constraints. Another example is to assist with aircraft landing, such as when landing at a location that is not known in advance or is altered mid-flight, or a remote location with limited access or availability of conventional wind measurement tools (e.g., due to topographical factors, such as difficult to reach terrain). While meteorological instruments and weather stations may provide a general indication of global wind parameters, there may be a significant difference between local wind conditions at nearby geographic locations, even over relatively short distances. Wind parameters are also highly variable and subject to rapid changes, and may be significantly influenced by a multitude of factors that cannot be anticipated in advance.

European Patent No. 1,413,899 (Diehl Munitionssysteme GmbH) entitled "Method of determining the height distribution of horizontal wind speed", discloses a method for determining the height profile of the horizontal wind speed, according to magnitude and direction, over a target area. A measuring device is positioned above the target area by means of a buoyant body. A relatively heavier falling body having relatively small dimensions, from which a lightweight thread element hangs off, is discharged to free fall. After the falling body reaches a constant falling speed the lightweight thread element is deflected by the respective crosswind. The lateral deflection of the thread element is measured, such as using a camera at the measuring device. The horizontal wind speed is then determined from the measured lateral deflection.

SUMMARY OF THE INVENTION

In accordance with one aspect of the present invention, there is thus provided an anemometer for independently measuring wind speed and wind direction in a fluid medium. The anemometer includes a first anemometer portion and a second anemometer portion, where the second portion has at least one attribute resulting in a different wind resistance in the fluid medium than the first anemometer portion. The anemometer is configured to be deployed to fall autonomously along a trajectory of the fluid medium, where the different wind resistance causes an inclination of the anemometer. The drag coefficient of the anemometer is effective for curtailing an initial ballistic trajectory such that the anemometer enters a free-fall descent after deployment The anemometer further includes at least one inclinometer, coupled to at least one anemometer portion. The inclinometer is configured to obtain inclination measurements of the anemometer from when the anemometer begins the free-fall descent. The anemometer further includes at least one memory/transmitter coupled to at least one anemometer portion and configured to store or transmit the inclination measurements. The local wind direction along the trajectory is determined from the inclination measurements based on the direction of inclination of the anemometer in correlation with the measurements timings, and the local wind speed along the trajectory is determined from the inclination measurements based on the degree of inclination of the anemometer in correlation with the measurements timings. The anemometer may be deployed from a moving airborne platform. The second portion may have a different attribute than the first portion respective of: mass; shape; density; specific gravity; drag coefficient; and/or freedom of motion. The anemometer may include a spherical first portion and a conical second portion embedded into the spherical first portion, the conical second portion having a smaller mass and a larger surface area than the spherical first portion. The fluid medium may be air or water. The anemometer may further include a compass, configured to obtain direction measurements of the anemometer. The anemometer may further include an altimeter, configured to obtain altitude measurements of the anemometer. The anemometer may further include an accelerometer, configured to obtain acceleration measurements of the anemometer. The anemometer may further include a g-force meter, configured to obtain g-force measurements of the anemometer. The anemometer may further include a global positioning system, configured to obtain geolocation measurements of the anemometer. The anemometer may further include a transceiver, configured to transmit or receive data. The anemometer may further include a speaker, configured to produce audio output. The anemometer may further include a microphone, configured to receive audio input. The anemometer may further include a clock, configured to establish timestamps. The anemometer may further include a camera, configured to capture at least one image. The anemometer may further include a processor, configured to receive the measurements and to determine the local wind direction and the local wind speed based on the received measurements. The processor may be configured to determine the local wind speed and the local wind direction by comparing the behavior of the anemometer under no wind conditions with the behavior of the anemometer under wind conditions. The processor may be configured to determine the local wind speed and local wind direction of a vertical wind component by comparing the rate of descent of the anemometer under no wind conditions with the rate of descent of the anemometer under wind conditions.

In accordance with a further aspect of the present invention, there is thus provided a method for independently measuring wind speed and wind direction in a fluid medium with an anemometer. The method includes the procedure of deploying an anemometer to fall autonomously along a trajectory of the fluid medium, the anemometer including a first anemometer portion and a second anemometer portion, where the second anemometer portion has at least one attribute resulting in a different wind resistance in the fluid medium than the first anemometer portion, where the different wind resistance causes an inclination of the anemometer. The drag coefficient of the anemometer is effective for curtailing an initial ballistic trajectory such that the anemometer enters a free-fall descent after deployment. The method further includes the procedure of obtaining inclination measurements of the anemometer from when the anemometer begins the free-fall descent, using at least one inclinometer, coupled to at least one anemometer portion. The method further includes the procedure of storing or transmitting the inclination measurements, using at least one unit, coupled to at least one anemometer portion. The method further includes the procedure of determining the local wind direction along the trajectory from the inclination measurements based on the direction of inclination of the anemometer in correlation with the measurement timings, and determining the local wind speed along the trajectory from the inclination measurements based on the degree of inclination of the anemometer in correlation with the measurement timings. The anemometer may be deployed from a moving airborne platform. The second portion may have a different attribute than the first portion respective of: mass; shape; density; specific gravity; drag coefficient; and/or freedom of motion. Determining the local wind speed and the local wind direction may include comparing the behavior of the anemometer under no wind conditions with the behavior of the anemometer under wind conditions. Determining the local wind speed and local wind direction may include determining the local wind speed and local wind direction of a vertical wind component by comparing the rate of descent of the anemometer under no wind conditions with the rate of descent of the anemometer under wind conditions.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a novel anemometer and method for measuring wind speed and wind direction. The anemometer includes a first portion and a second portion, each characterized with a different wind resistance resulting from one or more different attributes, such as due to having different shapes, different masses, different densities, different specific gravities, different drag coefficients, different freedoms of motion, and/or other attributes. The anemometer is deployed in a fluid medium, such as air or water, and the inclination of the anemometer indicates the local wind speed and local wind direction in the medium. In particular, the direction of inclination indicates the wind direction and the degree of inclination indicates the wind speed. The anemometer may be deployed to fall along a trajectory in the fluid medium, such as being ejected from an initial height to fall toward a ground surface, so as to provide measurements of the local wind speed and local wind direction along the trajectory. The anemometer may be utilized as part of a wind parameter indication device to provide local wind measurements, which may be transmitted to a remote location, for potential applications such as aircraft landing assistance or firefighting.

The term "anemometer" as used herein refers to a device or apparatus configured to measure wind speed (e.g., intensity of wind flow) and wind direction through any medium, including measuring the speed and direction of any gas or fluid through a gas or fluid medium, including but not limited to air or water. Accordingly, the term "wind" as used herein should be broadly construed to include the flow of any such gas or fluid. Similarly, the description herein is mainly provided for exemplary purposes in the context of an anemometer moving through air, but is equally applicable to movement through other fluids, such as water.

The term "repeatedly" as used herein should be broadly construed to include any one or more of: "continuously", "periodic repetition" and "non-periodic repetition", where periodic repetition is characterized by constant length intervals between repetitions and non-periodic repetition is characterized by variable length intervals between repetitions.

The phrase "for example" and variants thereof describe non-limiting embodiments of the presently disclosed subject matter. Certain features of the presently disclosed subject matter may be described in the context of separate embodiments, but may alternatively be provided in combination in a single embodiment. Conversely, certain features of the presently disclosed subject matter may be described in the context of a single embodiment, but may alternatively be provided separately or in any sub-combination.

Figure 1:
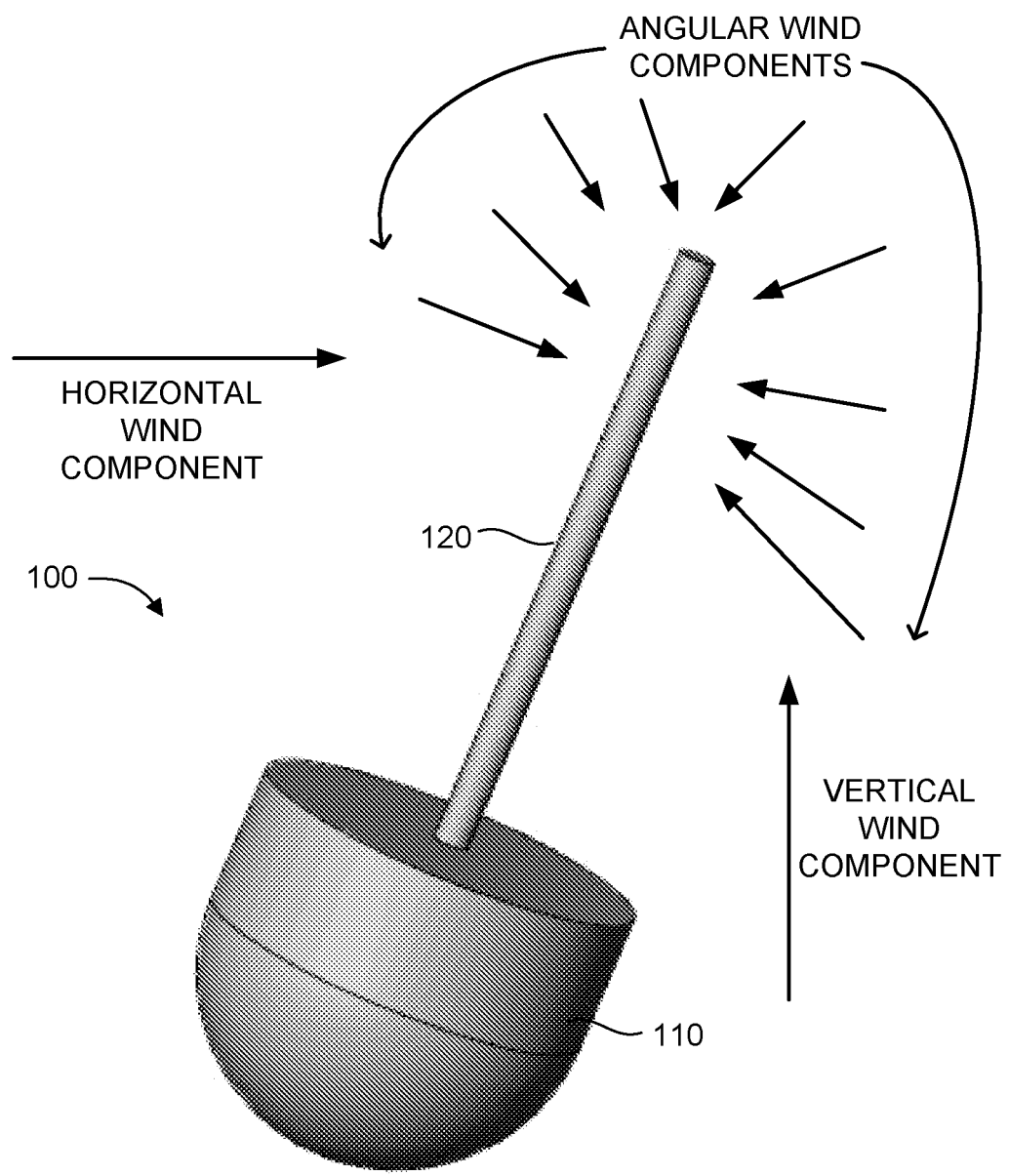
FIG. 1 is a perspective view illustration of an anemometer, constructed and operative in accordance with an embodiment of the present invention.

Reference is now made to FIG. 1, which is a perspective view illustration of an anemometer, generally referenced 100, constructed and operative in accordance with an embodiment of the present invention. Anemometer 100 includes a first portion, referenced 110, and a second portion, referenced 120. At least one physical attribute or characteristic of first portion 110 is different from that of second portion 120 in a manner that results in each portion 110, 120 having a different wind resistance and responding differently to fluid flow. For example, the shape, size, weight, density, surface area, drag coefficient, and/or another attribute of first portion 110 is different from the shape, size, weight, density, surface area, drag coefficient, and/or another attribute of second portion 120. In the example configuration of anemometer 110, second portion 120 is a thin cylindrical rod extending from the center of the flat surface of first portion 110 which has a semi-spherical shape and a heavier mass than second portion 120. As a result of these physical characteristics, second portion 120 has a different wind resistance than first portion 110, causing anemometer 100 to tilt or incline when falling through (or positioned in) the fluid medium, as will be discussed further hereinbelow. The term "wind resistance" as used herein generally refers to a quantity that reflects the resistance of the respective anemometer portion to an incident wind force (fluid flow), or correspondingly, the degree or amount by which the respective anemometer portion is shifted or repositioned upon contact with a local wind in the fluid medium. For example, a first portion 110 characterized with a lower wind resistance than a second portion 120 may imply that the first portion 110 will shift or move further along the direction at which the wind is flowing (i.e., toward the wind direction) relative to the second portion 120 when both come into contact with a given local wind. The different responses of each anemometer portion 110, 120 to the incident wind thereby results in an inclination or tilting of anemometer 100.

Figure 2:
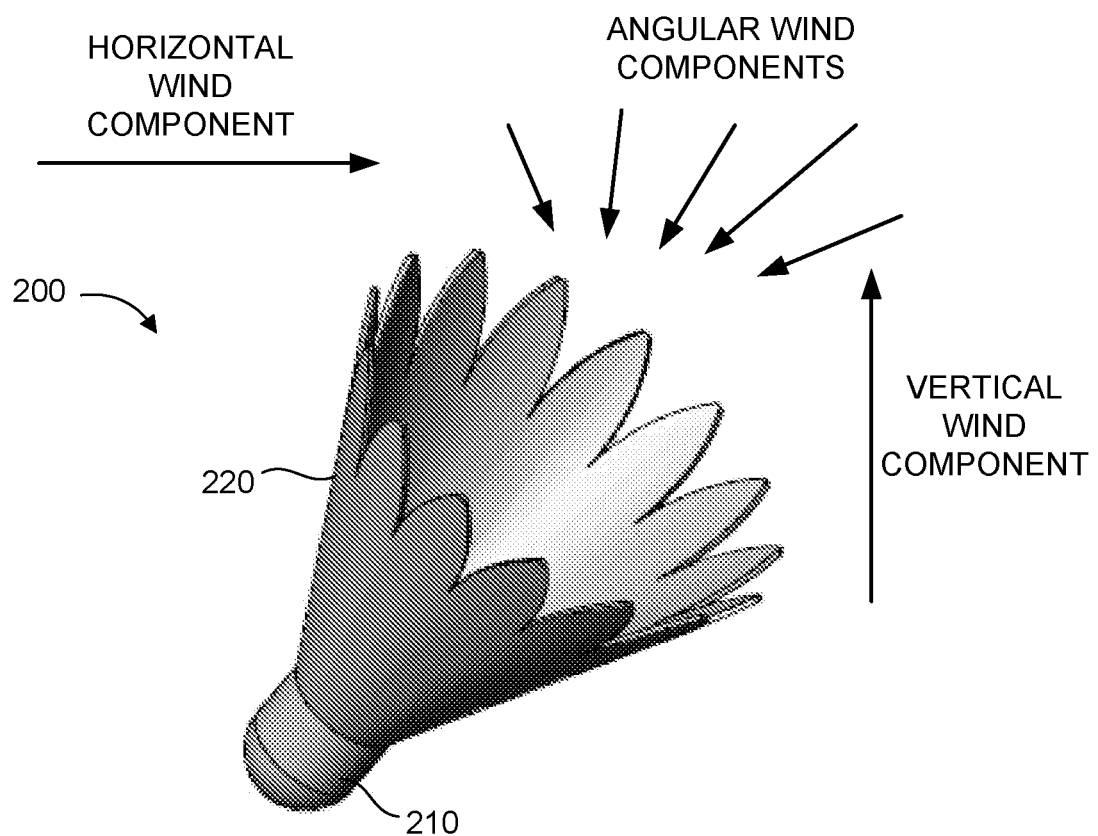
FIG. 2 is a perspective view illustration of an anemometer, constructed and operative in accordance with another embodiment of the present invention.

The geometries or physical characteristics of the first portion and the second portion of the anemometer of the present invention may differ in various ways. Reference is now made to FIG. 2, which is a perspective view illustration of an anemometer, generally referenced 200, constructed and operative in accordance with another embodiment of the present invention. Anemometer 200 includes a first portion, referenced 210, and a second portion, referenced 220. The configuration of anemometer 200 resembles that of a shuttlecock or "badminton birdie", where second portion 220 has an open conical shape embedded into a spherical first portion 210. The distal end of conical second portion 220 extends into a series of ridges or flaps, but may alternatively be a flat or uniform distal edge. The spherical first portion 210 may also be heavier (i.e., have a larger mass) than the conical second portion 220, which has a larger overall surface area than first portion 210. Due to their different geometries, conical second portion 220 has a different drag coefficient than spherical first portion 210, causing second portion 220 to react differently than first portion 210 to the existing wind and thus causing an inclination of anemometer 200 as it is falling through the air. It is appreciated that other suitable configurations of anemometers with a different first portion and second portion (i.e., having at least one attribute resulting in a different wind resistance than the first portion) are also within the scope of the present invention. For example, one portion of the anemometer is characterized by rigidity or stiffness while another portion may be characterized by elasticity or flexibility (e.g., by including materials such as ribbons or feathers). The first portion or second portion of the anemometer may further be designed in a manner that provides other selected aerodynamic (or hydrodynamic) characteristics.

The operation of the anemometer of the present invention will now be discussed with reference to anemometer 200. According to one embodiment of the present invention, anemometer 200 is deployed to fall along an aerial (or other fluid medium) trajectory, such as by being ejected from an aircraft in flight. The ejection may be implemented manually, such as being physically dropped or thrown by a user, or may be automated, such as using a projectile deployment mechanism or other robotic instrument. Anemometer 200 falls from an initial height and passes through the trajectory until eventually reaching a ground surface. It is noted that the ground surface on which the anemometer lands upon completing the trajectory may be any type of surface or terrain, including but not limited to: a natural surface, an artificial surface, the surface of a body of water, a platform or other structure on the ground, and the like.

Anemometer 200 may free fall through the aerial trajectory (i.e., such that gravity is the only force acting on it), or alternatively may be coupled with one or more components that affect its rate of descent or other aerodynamic characteristics. For example, anemometer 200 may be coupled with a stabilizing and/or decelerating component, such as a parachute (not shown). The stabilizing component may provide stability to the falling anemometer 200 so as to ensure it maintains a desired alignment or orientation along the aerial trajectory and/or upon landing. The decelerating component may reduce the rate of descent of the falling anemometer 200 so as to provide adequate time for acquiring the various measurements. For example, first portion 210 or second portion 220 may be vertically suspended from a parachute or hollow sleeve. In another example, anemometer 200 may be coupled to a gimbal, configured to maintain the relative alignment of first portion 210 and/or second portion 220. It is noted however that anemometer 200 does not need to be suspended from or connected to a different element or component but is operative to fall along the aerial trajectory autonomously.

As anemometer 200 is falling downwards, second portion 220 and first portion 210 react differently to the air flow (wind) due to their different wind resistances, which in turn causes anemometer 200 to repeatedly shift alignment, producing an inclination or tilting of anemometer 200 (e.g., relative to a horizontal and/or vertical reference axis). The direction of the inclination is a function of the direction of wind flow, while the amount or degree of the inclination is a function of the intensity of the wind flow. Thus, measuring the inclination direction of anemometer 200 provides an indication of the wind direction for that instant and location along the trajectory, and measuring the inclination degree of anemometer 200 provides an indication of the wind speed for that instant and location along the trajectory. The inclination of anemometer 200 may be subject to repeated transformations since anemometer 200 responds to the changes in wind conditions in real-time, and not merely the initial wind acting upon it. The inclination measurements may be obtained by various means, for example via: electronic readings, mechanical readings, a visual examination, and the like. For example, a processor (discussed with reference to FIG. 5) may repeatedly receive inclination measurements, such as from a mechanical interface and/or an electronic interface, and determine the corresponding local wind parameter values from the received inclination measurements. Alternatively, a user may determine local wind speed values by observing anemometer 200 as it falls along the trajectory and visually gauging or estimating the direction and degree of its inclination. The determination of inclination measurements may also use a combination of devices or techniques, each of which may be differentially weighted in accordance with relevant parameters, such as their relative accuracies and precisions. For example, a mechanical determination of inclination may be supplemented with a visual determination, such as for verification, or to provide a backup in case of a potential failure or malfunction of mechanical determination components.

According to another embodiment of the present invention, anemometer 200 is deployed to remain at a fixed position or location in the fluid medium, i.e., instead of falling along a trajectory. For example, anemometer 200 may be manually held by an individual or grasped by an external mechanism or instrument or may be coupled or affixed to an external component or surface, in a manner which still provides for the freedom of movement of anemometer 200 to allow for its inclination in the fluid medium resulting from the different wind resistances of first portion 210 and second portion 220. In such a case, anemometer 200 provides an indication of the wind direction and wind speed at a given location (i.e. the location where it is currently held or grasped or affixed). The location of anemometer 200 may then be repositioned, manually or in an automated manner, so as to obtain local wind measurements in additional locations.

The wind acting on anemometer 200 in the fluid medium may include a horizontal wind component, a vertical wind component, and/or any wind direction in between (i.e., along any angle or gradient between a horizontal and a vertical direction). In order to calculate the actual local wind parameters (direction/speed) from the readings (inclination measurements) of anemometer 200, the effect on the wind generated by the anemometer itself (i.e., the auxiliary wind component generated by anemometer 200) should be isolated. The behavior of anemometer 200 in ideal conditions characterized by no wind is identified in a preliminary calibration stage, such as in a laboratory setting (as ideal conditions generally do not exist in natural environments). The auxiliary wind component generated by anemometer 200 in different wind conditions can then be determined from its behavior under ideal (no wind) conditions, allowing for the isolation of this component from the anemometer readings. It is noted that vertical wind components may also be identified by isolating the auxiliary wind component generated by anemometer 200. For example, if the falling (descent) rate of anemometer 200 under ideal conditions is represented by X, then a vertical wind in an upward direction (i.e., originating from the ground) would cause anemometer 200 to fall at a rate lower than X, and conversely, a vertical wind in a downward direction (i.e., directed toward the ground) would cause anemometer 200 to fall at a rate higher than X. The descent of anemometer 200 can be tracked, such as via an altimeter (FIG. 4), allowing to compare the actual time required for anemometer 200 to descend a given distance with the time it would take to descend the same distance under zero wind conditions, thus providing an indication of the effect of vertical wind components along its descent. Similarly, the acceleration of anemometer 200 can be tracked via an accelerometer (FIG. 4), and a comparison of the actual acceleration with the ideal acceleration (under zero wind conditions) can provide additional information relating to the wind effects. A wind at a non-vertical direction, i.e., directed at an angle relative to the vertical axis, will result in an inclination of anemometer 200 from which the local wind direction and local wind speed can then be calculated (after isolating the wind component generated by anemometer 200 itself), as discussed. Anemometer 200 may thus effectively measure any wind not generated by itself, encompassing wind components from any angle or direction, by comparing the behavior of the anemometer under ideal (zero wind) conditions with the actual behavior of the anemometer in response to the existing winds.

The rate of descent of anemometer 200 may be influenced by additional factors beyond the gravitational force acting on it, such as an initial applied velocity, or a downward wind that would increase its acceleration, or an upward wind that would decrease its acceleration, or a non-vertical wind component. Accordingly, equations for the acceleration of a free-falling body may be utilized to calculate the free fall motion of the anemometer. For example:

$$v(t) = v'_0 + g \cdot t;$$

$$v(t) = t'_0 \cdot h + \left(\frac{1}{2}\right) \cdot g \cdot t^2$$

where:
$v_0$=initial velocity;
h=height;
t=time; and g=gravitational constant (−9.81 m/s²).

It is noted that the drift of anemometer 200 caused by the wind effects may also influence the rate of descent. Anemometer 200 may remain in its current trajectory longer due to the wind drift as compared to when falling along a linear vertical path. Anemometer 200 may calculate the wind drift, such as using measurements obtained by an accelerometer and/or GPS (FIG. 5), and then isolate the effect of the wind drift from the measured wind direction and wind speed.

Although the anemometer inherently seeks to enter a vertical free-fall descent, the anemometer may undergo an initial acceleration upon deployment. For example, if anemometer 200 is launched or dropped from an aircraft mid-flight then the aircraft velocity may influence the initial ballistic trajectory of anemometer 200. Similarly, if the anemometer is otherwise subject to an inertial horizontal velocity, such as if deployed using a projectile launcher. Such an initial acceleration and the resultant ballistic trajectory is minimal and typically lasts for a relative brief duration, until the anemometer begins its free fall descent. However, the aerodynamic characteristics of anemometer 200 cause it to align itself in the direction of the dominant wind component and then is pulled downwards under gravitational force. Within these reference coordinates, anemometer 200 falls vertically and aligns with the ground surface, as it is inclined toward the wind direction (due to the differing wind resistance attributes of first portion 210 and second portion 220) regardless of its actual trajectory. In any case, the wind measurements are not acquired until after the initial negligible period during which the anemometer may be influenced by an initial inertial force (i.e., an initial velocity in a horizontal or non-vertical direction) and resulting ballistic trajectory. The brief initial ballistic trajectory may be calculated and isolated from the vertical descent. Anemometer 200 may receive an indication from internal components, such as an accelerometer or GPS (FIG. 5), that it is currently in a ballistic trajectory caused by an initial horizontal force (e.g., when ejected from a moving aircraft) and the downward gravitational force. The ballistic trajectory of anemometer 200 under ideal (i.e., zero wind) conditions is stored as a known variable. Based on the measured parameters and a comparison with the ballistic trajectory under zero wind conditions, the actual ballistic trajectory (under prevailing wind conditions) of anemometer 200 may be determined and isolated.

In effect, the anemometer of the present invention intrinsically seeks to avoid entering into a ballistic trajectory. The impact of the downward vertical force is much greater than any initial inertial velocity as soon as the anemometer begins its free-fall descent. This is an inherent result of the aerodynamic characteristics of the anemometer. The anemometer is configured such that its drag coefficient is large enough to ensure that the anemometer begins its vertical free-fall trajectory almost immediately and to curtail any initial ballistic trajectory. For example, the drag coefficient may be sufficiently large to ensure that the anemometer would reach a complete stop when not subject to an acceleration but not too large so as to preclude free-fall, where the mass is such that the anemometer will descend despite the drag coefficient.

While the anemometer may optionally include stabilizing and/or decelerating components, such components are not essential for its operation, which relies on the different wind resistances of the different portions of the anemometer, which itself also generates an auxiliary wind component (air flow through the surrounding medium) during its descent. Furthermore, the anemometer is not limited to a minimum velocity in order to begin acquiring measurements, but is capable of operating at any velocity, from an initial velocity of zero (relating to the anemometer itself or a mechanism from which it is deployed) up until substantially high velocities. The anemometer does not need to be suspended from anything or connected to a separate element or mechanism but can move freely through space in an autonomous manner.

The measured wind direction may be expressed in different formats, such as in an angular format (e.g., between 0° and 360°) or in terms of compass points or cardinal directions (i.e., relative to North, East, West, South). The measured wind parameters may also be expressed in relation to the real-time situation of a respective user, such as in relation to a driver or passenger of a moving vehicle or aircraft (e.g., "headwind"; "tailwind"; "wind arriving from 9 o'clock).

Anemometer 200 may be composed of any suitable material, such as a material that provides durability and the ability to withstand exposure to an outdoor environment, particularly in rugged weather conditions (e.g., extreme heat or extreme cold, as well as different forms of precipitation). Anemometer 200 may be configured to withstand a forceful impact (e.g., upon landing, and if encountering obstructions along the trajectory). Anemometer 200 may also be water-resistant, allowing for deployment and operation in a water environment. Anemometer 200 may be reusable for multiple deployments, or may be disposable (single use).

Figure 3:
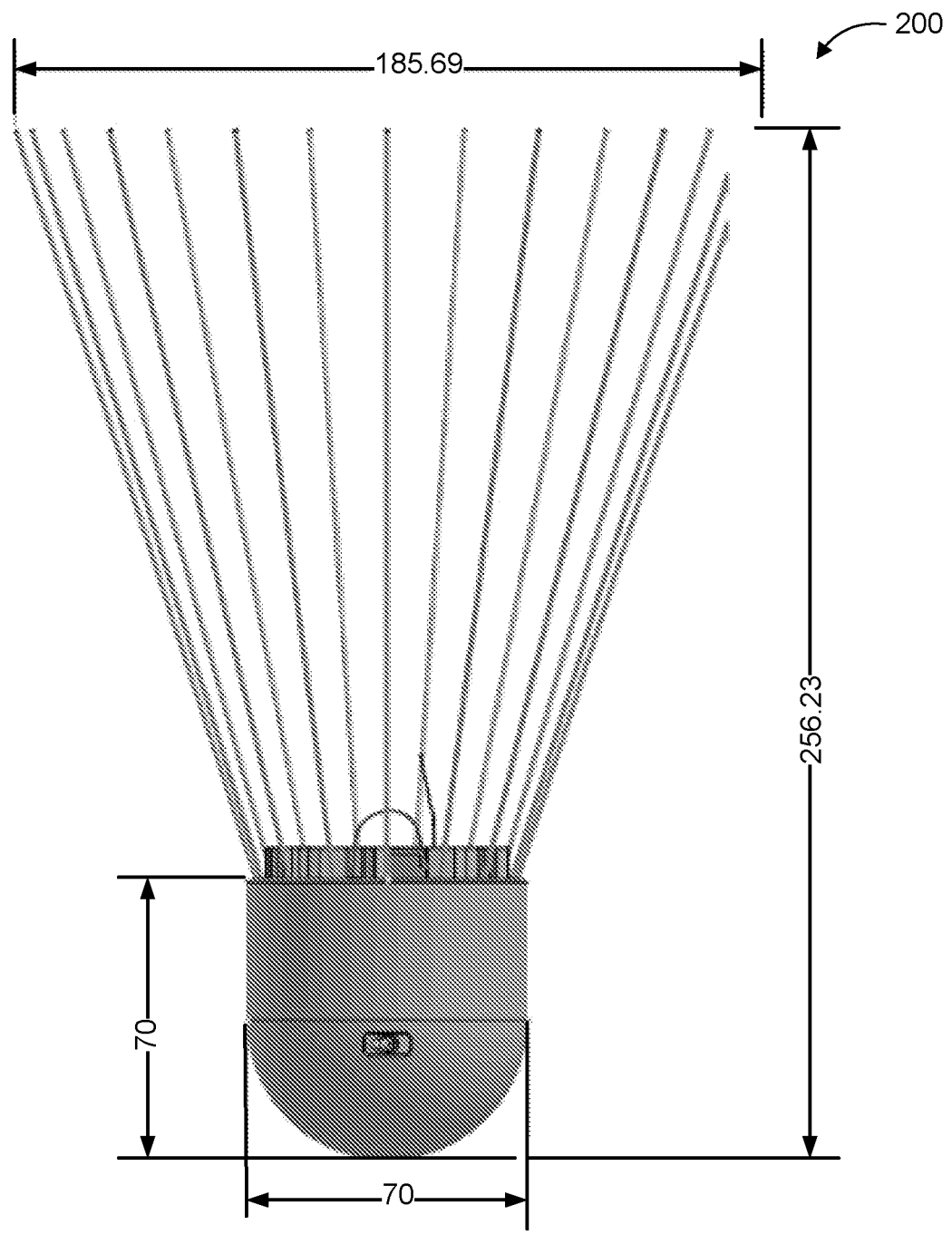
FIG. 3 is a front view illustration of the anemometer of FIG. 2 with exemplary dimensions, constructed and operative in accordance with an embodiment of the present invention.

Reference is now made to FIG. 3, which is a front view illustration of the anemometer (200) of FIG. 2 with exemplary dimensions, constructed and operative in accordance with an embodiment of the present invention. Anemometer 200 is depicted in an upright position, with an overall height (including both portion 210 and portion 220) of approximately 256.23 mm. The height and width (and diameter) of first portion 210 is approximately 70 mm, and the width of the distal end (conical edge) of second portion 220 is approximately 185.69 mm. It is appreciated that these represent exemplary dimensions only, and alternative dimensions may also be suitable.

The anemometer of the present invention may be incorporated in a wind parameter indication device that measures local wind parameters along a trajectory, which can then be transmitted to a remote location for various uses. The following description discusses anemometer 200 in such a context.

Figure 4:
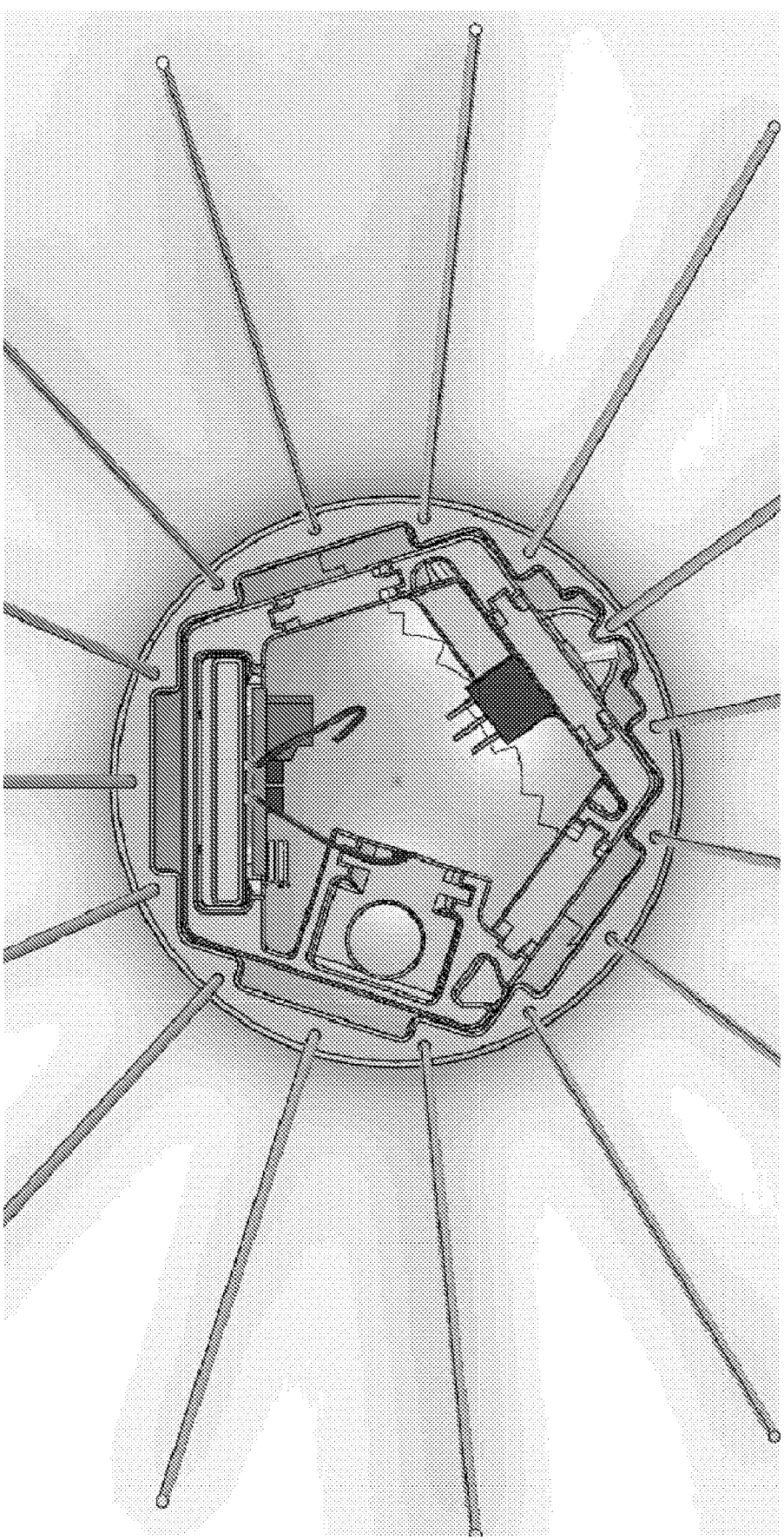
FIG. 4 is a cross-sectional bottom view illustration of the anemometer of FIG. 2, constructed and operative in accordance with an embodiment of the present invention.

Reference is now made to FIG. 4, which is a cross-sectional bottom view illustration of the anemometer (200) of FIG. 2, constructed and operative in accordance with an embodiment of the present invention. First portion 210 of anemometer 200 includes a housing in which additional components may be contained.

Figure 5:
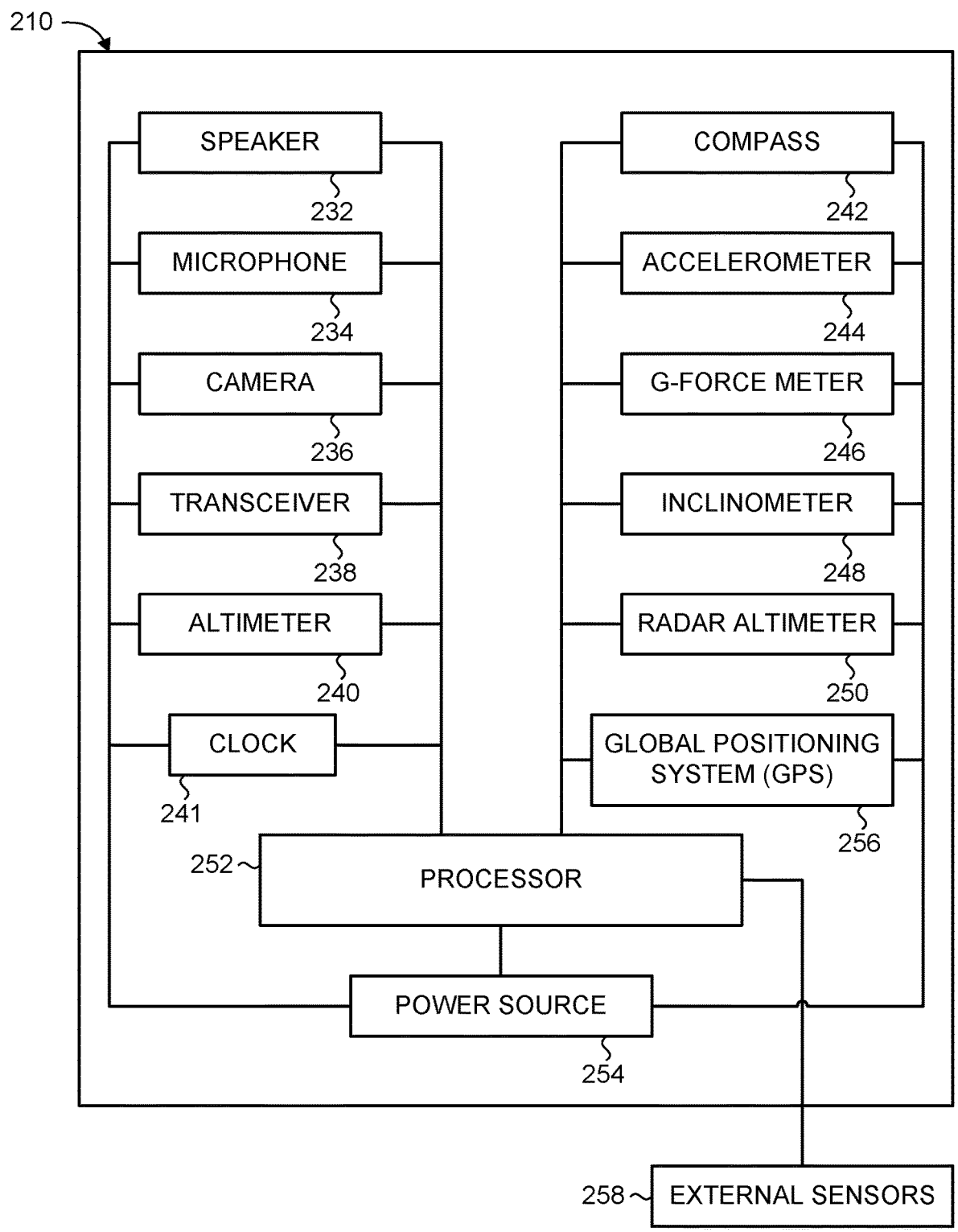
FIG. 5 is a block diagram of components housed in the first portion of the anemometer of FIG. 2, constructed and operative in accordance with an embodiment of the present invention.

Reference is now made to FIG. 5, which is a block diagram of components housed in the first portion (210) of the anemometer (200) of FIG. 2, constructed and operative in accordance with an embodiment of the present invention. First portion 210 includes a speaker 232, a microphone 234, a camera 236, a transceiver 238, an altimeter 240, a clock 241, a compass 242, an accelerometer 244, a g-force meter 246, an inclinometer 248, a radar altimeter 250, a global positing system (GPS) 256, a processor 252, and a power source 254. At least some of the above components may be optional. At least some of the above components may also be housed in second portion 220, instead of or in addition to being housed in first portion 210. Anemometer 200 may also include additional components for enabling the implementation of the disclosed subject matter, such as a memory or storage unit (not shown) for data storage.

Speaker 232 receives audio input, such as for providing verbal instructions or information. Microphone 234 produces audio output for indicating information audibly, such as to provide verbal alerts or notifications.

Camera 236 may acquire one or more images during the deployment of anemometer 200. The captured images may be used in real-time, such as for the determination of the inclination measurements by image processing, or for post-analysis.

Transceiver 238 transmits and receives data, such as allowing for the transmission of the determined wind parameters to a remote receiver. The data transmission may use any suitable transmission format, such as an electromagnetic signal (e.g. radio frequency), and use any suitable data communication channel.

Altimeter 240 measures the altitude of anemometer 200, with respect to a reference level. Altimeter 240 may be embodied by a pressure or barometric altimeter, a laser rangefinder, a sonic altimeter, a radar altimeter, and the like. Anemometer 200 may include altimeter 240 in addition to or instead of radar altimeter 250, discussed below.

Clock 241 records the time or duration of an event. For example, clock 241 provides a timestamp for the obtained inclination measurements and other readings, indicating the time and date when the measurement occurred.

Compass 242 measures the direction of anemometer 200, with respect to reference coordinates. Compass 242 may be embodied by a magnetic compass, a gyrocompass, an electronic compass (e.g., a magnetometer or a fiber optic gyrocompass), and the like.

Accelerometer 244 measures the acceleration of anemometer 200, such as by measuring the acceleration of an inertial reference frame relative to itself. It is noted that accelerometer 244 may also provide an indication of the acceleration caused by the inclination of anemometer 200. Accelerometer 244 may be embodied by a piezoelectric accelerometer, a microelectromechanical systems (MEMS) accelerometer, a strain gauge accelerometer, a laser accelerometer, and the like.

G-force meter 246 measures the gravitational-force (g-force) of anemometer 200. G-force meter 246 may be embodied by accelerometer 244 or an alternative device configured to measure acceleration caused by weight or force of gravity.

Inclinometer 248 measures the inclination of anemometer 200, such as the inclination of first portion 210 and/or second portion 220 relative to a reference axis. The term "inclinometer" as used herein should be broadly construed to refer to any type of device or apparatus which can be used to measure or determine an angle or tilt or inclination of an object with respect to a reference direction. For example, inclinometer 248 may be embodied by: a tilt sensor, a gradient meter; a slope gauge; an electronic inclinometer, a mechanical inclinometer, a multi-axis inclinometer, a MEMS inclinometer, an accelerometer, a camera, and the like.

GPS 256 provides geolocation and timing information of anemometer 200. GPS 256 may thus also provide an indication of the altitude of anemometer 200, based on its geographic position. GPS 256 may also be used to compensate or correct the wind parameter measurements obtained by anemometer 200, by indicating the deviation of its downward trajectory from an ideal vertical path as a result of the wind acting upon it (among other factors).

Power source 254 provides power required by components of anemometer 200.

Processor 252 receives instructions and data from the components of anemometer 200. For example, processor 252 receives various anemometer readings (e.g., altitude, direction, acceleration, inclination, g-force) and determines the local wind speed and local wind direction along the trajectory of anemometer 200 based on the various readings. Processor 252 may also obtain information from sources external to anemometer 200, such as external sensors 258. For example, external sensors 258 may include an instrument landing system (ILS) for aircraft guidance, which can provide various parameters of interest, such as altitude. While anemometer 200 is falling, processor 252 repeatedly receives altitude measurements from altimeter 240, radar altimeter 250, and/or GPS 256; repeatedly receives direction measurements from compass 242; repeatedly receives acceleration measurements from accelerometer 242, and repeatedly receives inclination measurements from inclinometer 248. Processor 252 repeatedly determines the direction and amount of inclination of anemometer 200, such as using the inclination measurements from inclinometer 248 and/or using the acceleration measurements from accelerometer 244, with respect to a reference direction, using the direction measurements provided by compass 242. Processor 252 repeatedly determines the local wind direction and local wind speed by comparing the measured inclination of the anemometer with the behavior of the anemometer under ideal or zero wind conditions (i.e., determined in a preliminary calibration stage).

The determined wind parameter values may be stored and timestamped, and transmitted to a remote location using transceiver 238. Processor 252 may further associate the determined wind parameter values with their respective altitudes, using the altitude measurements from altimeter 240, radar altimeter 250, and/or GPS 256. It is noted that altimeter 240 (e.g., a barometric altimeter) may provide altitude measurements in relative terms, such as relative to sea level ("mean sea level (MSL)" measurements). However, the altitude relative to the ground ("above ground level (AGL)"), is dependent on the geographic location at which anemometer 200 is deployed, which may be determined using radar altimeter 250 or a laser based altimeter, or using GPS 256. Therefore, processor 252 may obtain an indication of the MSL and/or AGL altitude in real-time from altimeters 240, 250 (and/or GPS 256) for associating the wind measurements. Alternatively, processor 252 may retroactively determine the wind parameter values associated with a selected altitude with respect to a ground surface, based on when anemometer 200 reaches the ground surface. Processor 252 may determine when anemometer 200 has reached a ground surface by using the acceleration measurements from accelerometer 244, such as by identifying a substantial change in the acceleration measurements over a brief duration, or alternatively by using the altitude measurements, such as by identifying when altimeter 240 ceases to provide successive distinct readings. Processor 252 may then determine an absolute altitude associated with the ground surface (e.g., a "ground level altitude"), determine the selected altitude in relation to the ground level altitude, and then retroactively determine the wind parameter values associated with the selected altitude in relation to the ground level altitude, such as using the timestamps. Transceiver 238 may transmit one or more determined wind parameter values, such as wind parameters corresponding to at least one selected altitude (e.g., 50 meters AGL or MSL) or corresponding to intermittent altitude levels (e.g., every 5 meters). The determined wind parameter values may be transmitted repeatedly or continuously, such as in real-time (i.e., upon determination), or after anemometer 200 has reached the ground surface. The determined wind parameter values may also be indicated by anemometer 200, such as via an audible notification (e.g., using speaker 232), a visual indication (e.g., using a display—not shown), and/or a tactile indication (e.g., using a vibrating mechanism—not shown), where the indications may be provided repeatedly, such as in real-time.

The anemometer of the present invention is configured to operate autonomously and independently of other external devices or data sources, such that all the necessary measurements and processing is performed by the anemometer itself. In particular, the inclination measurements of the anemometer are obtained and the wind parameters are determined solely using onboard components embedded in the anemometer, without requiring additional remotely located components, allowing the anemometer to operate in a self-sufficient manner. The anemometer of the present invention may be used, for example, to assist with landing an aircraft at a remote location not known in advance and for which reliable local wind parameters are difficult or impossible to obtain. Another potential application is to assist firefighting and rescue efforts, by providing an accurate indication of the local wind parameters at the location of a fire, which may be otherwise difficult to obtain due to heavy smoke and reduced access.

In accordance with the present invention, a method for measuring wind speed and wind direction in a fluid medium includes the procedure of deploying an anemometer to fall autonomously along a trajectory in the fluid medium, the anemometer including a first portion and a second portion, the second portion having at least one attribute resulting in a different wind resistance in the fluid medium than the first portion, where the different wind resistance causes an inclination of the anemometer. The method further includes the procedure of determining the local wind direction in the fluid medium along the trajectory according to the direction of inclination of the anemometer, and determining the local wind speed in the fluid medium along the trajectory according to the degree of inclination of the anemometer. The drag coefficient of the anemometer is effective for curtailing an initial ballistic trajectory such that the anemometer enters a free-fall descent after deployment, where the wind measurements of wind speed and wind direction are obtained from when the anemometer begins the free-fall descent.

It will be appreciated by persons skilled in the art that the present invention is not limited to what has been particularly shown and described hereinabove.

The invention claimed is:

1. An anemometer for independently measuring wind speed and wind direction in a fluid medium, the anemometer comprising:
   a first anemometer portion; and
   a second anemometer portion, having at least one attribute resulting in a different wind resistance in the fluid medium than the first anemometer portion,
   the anemometer configured to be deployed to fall autonomously along a trajectory of the fluid medium, wherein the different wind resistance causes an inclination of the anemometer, and wherein the drag coefficient of the anemometer is effective for curtailing an initial ballistic trajectory such that the anemometer enters a free-fall descent after deployment;
   the anemometer further comprising: at least one inclinometer, coupled to at least one anemometer portion, the inclinometer configured to obtain inclination measurements of the anemometer from when the anemometer begins the free-fall descent; and
   at least one memory/transmitter coupled to at least one anemometer portion and configured to store or transmit the inclination measurements,
   wherein the local wind direction along the trajectory is determined from the inclination measurements based on the direction of inclination of the anemometer in correlation with the measurements timings, and the local wind speed along the trajectory is determined from the inclination measurements based on the degree of inclination of the anemometer in correlation with the measurements timings.

2. The anemometer of claim 1, wherein the anemometer is configured to be deployed from a moving airborne platform.

3. The anemometer of claim 1, wherein the attribute resulting in a different wind resistance is selected from the group consisting of:
   mass;
   shape;
   density;
   specific gravity;
   drag coefficient;
   freedom of motion; and
   any combination of the above.

4. The anemometer of claim 1, comprising a spherical first portion and a conical second portion embedded into the spherical first portion, the conical second portion having a smaller mass and a larger surface area than the spherical first portion.

5. The anemometer of claim 1, wherein the fluid medium is selected from the group consisting of:
   air; and
   water.

6. The anemometer of claim 1, further comprising at least one element selected from the list consisting of:
   a compass, configured to obtain direction measurements of the anemometer;
   an altimeter, configured to obtain altitude measurements of the anemometer;
   an accelerometer, configured to obtain acceleration measurements of the anemometer;
   a g-force meter, configured to obtain g-force measurements of the anemometer;
   a global positioning system, configured to obtain geolocation measurements of the anemometer;
   a transceiver, configured to transmit or receive data;
   a speaker, configured to produce audio output;
   a microphone, configured to receive audio input;
   a clock, configured to establish timestamps;
   a camera, configured to capture at least one image; and
   a processor, configured to receive the measurements and to determine the local wind direction and the local wind speed based on the received measurements.

7. The anemometer of claim 6, wherein the processor is configured to determine the local wind speed and the local wind direction by comparing the behavior of the anemometer under no wind conditions with the behavior of the anemometer under wind conditions.

8. The anemometer of claim 6, wherein the processor is configured to determine the local wind speed and local wind direction of a vertical wind component by comparing the rate of descent of the anemometer under no wind conditions with the rate of descent of the anemometer under wind conditions.

9. A method for independently measuring wind speed and wind direction in a fluid medium with an anemometer, the method comprising the procedures of:

deploying an anemometer to fall autonomously along a trajectory of the fluid medium, the anemometer comprising: a first anemometer portion and a second anemometer portion having at least one attribute resulting in a different wind resistance in the fluid medium than the first anemometer portion, wherein the different wind resistance causes a inclination of the anemometer, and wherein the drag coefficient of the anemometer is effective for curtailing an initial ballistic trajectory such that the anemometer enters a free-fall descent after deployment;

obtaining inclination measurements of the anemometer from when the anemometer begins the free-fall descent, using at least one inclinometer, coupled to at least one anemometer portion;

storing or transmitting the inclination measurements, using at least one unit, coupled to at least one anemometer portion; and determining the local wind direction along the trajectory from the inclination measurements based on the direction of inclination of the anemometer in correlation with the measurement timings, and determining the local wind speed along the trajectory from the inclination measurements based on the degree of inclination of the anemometer in correlation with the measurement timings.

10. The method of claim 9, wherein the anemometer is deployed from a moving airborne platform.

11. The method of claim 9, wherein the attribute resulting in a different wind resistance is selected from the group consisting of:
mass;
shape;
density;
specific gravity;
drag coefficient;
freedom of motion; and
any combination of the above.

12. The method of claim 9, wherein determining the local wind speed and the local wind direction comprises comparing the behavior of the anemometer under no wind conditions with the behavior of the anemometer under wind conditions.

13. The method of claim 9, wherein determining the local wind speed and local wind direction comprises determining the local wind speed and local wind direction of a vertical wind component by comparing the rate of descent of the anemometer under no wind conditions with the rate of descent of the anemometer under wind conditions.

* * * * *